United States Patent
Yang et al.

(10) Patent No.: US 12,483,189 B2
(45) Date of Patent: Nov. 25, 2025

(54) MLPE PHOTOVOLTAIC SYSTEM AND MLPE DEVICE DETECTION METHOD THEREOF

(71) Applicant: Sungrow Power Supply Co., Ltd., Hefei (CN)

(72) Inventors: Yu Yang, Hefei (CN); Xinyu Wang, Hefei (CN); Jun Xu, Hefei (CN); Qiaodi Chen, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 76 days.

(21) Appl. No.: 18/281,945

(22) PCT Filed: Dec. 15, 2021

(86) PCT No.: PCT/CN2021/138256
§ 371 (c)(1),
(2) Date: Sep. 13, 2023

(87) PCT Pub. No.: WO2022/222507
PCT Pub. Date: Oct. 27, 2022

(65) Prior Publication Data
US 2024/0154424 A1 May 9, 2024

(30) Foreign Application Priority Data
Apr. 19, 2021 (CN) .......................... 202110417941.5

(51) Int. Cl.
*H02S 50/10* (2014.01)
*H02J 3/38* (2006.01)

(52) U.S. Cl.
CPC .............. *H02S 50/10* (2014.12); *H02J 3/381* (2013.01); *H02J 2300/24* (2020.01); *Y02E 10/56* (2013.01)

(58) Field of Classification Search
CPC .......... H02S 50/00–10; H02S 40/30–38; H02J 3/38–381; H02J 2300/24–26;
(Continued)

(56) References Cited

U.S. PATENT DOCUMENTS

2008/0147335 A1 * 6/2008 Adest ................... G01R 22/063
702/188
2012/0274138 A1 * 11/2012 Bundschuh ............... G05F 1/67
307/64
(Continued)

FOREIGN PATENT DOCUMENTS

| CN | 102291052 A | 12/2011 |
| CN | 111092598 A | 5/2020 |

(Continued)

OTHER PUBLICATIONS

English machine translation of CN111711416A published Sep. 25, 2020 (Year: 2020).*
(Continued)

*Primary Examiner* — Rexford N Barnie
*Assistant Examiner* — David A Shiao
(74) *Attorney, Agent, or Firm* — Wolf, Greenfield & Sacks, P.C.

(57) ABSTRACT

An MLPE photovoltaic system and an MLPE device detection method thereof. An output end of each MLPE device is connected to a corresponding bus in the MLPE photovoltaic system, and each MLPE device has its own positioning number. The method includes detection operation which is executed at least once, and the detection operation includes: controlling an MLPE device having a corresponding positioning number to perform operation state switching, and acquiring operation characteristics of a corresponding bus before and after switching; determining whether the change of the operation characteristics satisfies a preset change
(Continued)

condition; and if not, determining that the state of the MLPE device having the corresponding positioning number is abnormal.

17 Claims, 7 Drawing Sheets

(58) Field of Classification Search
CPC .............. Y02E 10/56; G01R 31/08–11; G01R 31/327–3336; G01R 31/40–42
See application file for complete search history.

(56) References Cited

U.S. PATENT DOCUMENTS

| | | | |
|---|---|---|---|
| 2014/0001865 A1* | 1/2014 | Osterloh | H02S 50/10 307/77 |
| 2014/0070815 A1* | 3/2014 | Liu | G01R 31/52 324/510 |
| 2014/0159763 A1 | 6/2014 | Luo et al. | |
| 2017/0104447 A1 | 4/2017 | Bintz et al. | |
| 2017/0207620 A1* | 7/2017 | Zhu | H02J 3/381 |
| 2017/0222601 A1* | 8/2017 | Xu | H02S 50/00 |
| 2018/0172751 A1* | 6/2018 | Takeuchi | G01R 31/66 |
| 2018/0316191 A1 | 11/2018 | Zhu et al. | |
| 2020/0162023 A1* | 5/2020 | Crites | H02S 50/10 |
| 2022/0014015 A1* | 1/2022 | Hsu | H02M 1/32 |
| 2022/0069769 A1* | 3/2022 | Yu | H02S 50/00 |
| 2023/0126969 A1* | 4/2023 | Yang | H02H 3/087 361/88 |

FOREIGN PATENT DOCUMENTS

| | | | |
|---|---|---|---|
| CN | 111711416 A | * | 9/2020 |
| CN | 113131518 A | | 7/2021 |
| KR | 20110005368 A | * | 1/2011 |

OTHER PUBLICATIONS

English machine translation of KR20110006368A published Jan. 18, 2011 (Year: 2011).*
International Search Report and Written Opinion for International Application No. PCT/CN2021/138256, mailed Mar. 9, 2022.

* cited by examiner

MLPE PHOTOVOLTAIC SYSTEM AND MLPE DEVICE DETECTION METHOD THEREOF

This application is a national stage filing under 35 U.S.C. § 371 of International Patent Application Serial No. PCT/CN2021/138256, filed Dec. 15, 2021, which claims priority to Chinese Patent Application No. 202110417941.5, titled "MLPE PHOTOVOLTAIC SYSTEM AND MLPE DEVICE DETECTION METHOD THEREOF", filed on Apr. 19, 2021 with the China National Intellectual Property Administration. The contents of these applications are which is incorporated herein by reference in their entireties.

FIELD

The present disclosure relates to technical field of detection, and in particular to an MLPE photovoltaic system and an MLPE device detection method for an MLPE photovoltaic system.

BACKGROUND

Generally, A Module-Level Power Electronics (MLPE) photovoltaic system is provided with multiple MLPE devices, such as an optimizer, a shutdown device, a micro inverter, and an energy storage BMS unit. During the operation and maintenance of the MLPE photovoltaic system, it is required to detect states of the MLPE devices to screen out an MLPE device with faults or performance degradation to an extent and then replace or label the MLPE device.

According to the conventional operation, maintenance and detection solutions, it is required for the technical personnel to detect a state of each of the MLPE devices on-site to determine an MLPE device that abnormally operates. Due to that the MLPE photovoltaic system includes a large number of MLPE devices and the MLPE devices are usually arranged at roofs or below photovoltaic modules, the process of manual troubleshooting one by one is slow, resulting in high costs for operation and maintenance.

SUMMARY

An MLPE photovoltaic system and an MLPE device detection method for an MLPE photovoltaic system are provided according to the present disclosure, to solve the problems of excessive time required for the technical personnel to detect each of MLPE devices on site and high costs for operation, maintenance and troubleshooting according to the conventional operation, maintenance and detection solutions for MLPE devices.

In order to achieve the above objectives, the following solutions are provided according to the embodiments of the present disclosure.

In a first aspect, an MLPE device detection method for an MLPE photovoltaic system is provided according to the present disclosure. An output terminal of an MLPE device is connected to a bus corresponding to the MLPE device in the MLPE photovoltaic system, and the MLPE device is configured with a positioning number. The MLPE device detection method includes at least one detection process. The detection process includes: controlling an MLPE device with a positioning number to perform operation state switching, and acquiring an operation feature of a bus corresponding to the MLPE device before the operation state switching and an operation feature of the bus corresponding to the MLPE device after the operation state switching; determining whether a change, between the operation feature of the bus corresponding to the MLPE device before the operation state switching and the operation feature of the bus corresponding to the MLPE device after the operation state switching, meets a predetermined change condition; and in a case that the change does not meet the predetermined change condition, determining that the MLPE device with the positioning number operates in an abnormal state.

In an embodiment, in the MLPE device detection method for an MLPE photovoltaic system, at least one MLPE device is detected in the at least one detection process.

In an embodiment, in the MLPE device detection method for an MLPE photovoltaic system, for MLPE devices connected to a same bus, the MLPE device detection method includes at least one troubleshooting process. The at least one troubleshooting process includes the at least one detection process.

In an embodiment, in the MLPE device detection method for an MLPE photovoltaic system, for the MLPE devices connected to the same bus, the MLPE device detection method includes: multiple troubleshooting processes. In adjacent two troubleshooting processes, for an MLPE device that is determined to be operating in the abnormal state in a detection process in a previous troubleshooting process, a detection process is performed on the MLPE device in a subsequent troubleshooting process; and the number of MLPE devices detected in the detection process in the subsequent troubleshooting process is less than or equal to the number of MLPE devices detected in the detection process in the previous troubleshooting process.

In an embodiment, in the MLPE device detection method for an MLPE photovoltaic system, in a first troubleshooting process, only one detection process is performed on the MLPE devices connected to the same bus; and in a detection process in a last troubleshooting process, only one MLPE device is detected.

In an embodiment, in the MLPE device detection method for an MLPE photovoltaic system, for the MLPE devices connected to the same bus, the MLPE device detection method includes: performing only one troubleshooting process. The troubleshooting process includes multiple detection processes, and only one MLPE device is detected in each of the multiple detection processes.

In an embodiment, in the MLPE device detection method for an MLPE photovoltaic system, the controlling an MLPE device with a positioning number to perform operation state switching includes: transmitting a control command to the MLPE device with the positioning number.

In an embodiment, in the MLPE device detection method for an MLPE photovoltaic system, in a case that the control command is a turning on command or a turning off command, the operation feature of the bus corresponding to the MLPE device is a bus voltage; and in a case that the control command is an outputting active power command, an outputting reactive power command, or a shutdown command, the operation feature of the bus corresponding to the MLPE device is an output power.

In an embodiment, in the MLPE device detection method for an MLPE photovoltaic system, after determining that the MLPE device with the positioning number operates in the abnormal state, the MLPE device detection method further includes: calling a number list for the MLPE device, querying the number list based on the positioning number of the MLPE device, and determining an installation position of the MLPE device.

In an embodiment, in the MLPE device detection method for an MLPE photovoltaic system, after determining the installation position of the MLPE device, the MLPE device detection method further includes: generating and outputting an alarm signal to prompt a maintenance alarm for the MLPE device with the positioning number.

In an embodiment, in the MLPE device detection method for an MLPE photovoltaic system, before a first detection process is performed, the MLPE device detection method further includes: receiving a detection command. The detection command is periodically transmitted by a cloud processor or is transmitted by a local control device on-site.

In an embodiment, in the MLPE device detection method for an MLPE photovoltaic system, in a case that the change meets the predetermined change condition, the MLPE device detection method further includes: determining that the MLPE device with the positioning number operates in a normal state.

In a second aspect, an MLPE photovoltaic system is provided according to the present disclosure. The MLPE photovoltaic system includes: at least one MLPE device, at least one direct-current source and at least one monitoring unit. An input terminal of the at least one MLPE device is connected to the at least one direct-current source, and an output terminal of the at least one MLPE device is connected to a bus corresponding to the MLPE device in the MLPE photovoltaic system. Each of the at least one MLPE device is configured with a positioning number. Each of the at least one MLPE device is communicatively connected to the at least one monitoring unit. The at least one monitoring unit is configured to: independently control the at least one MLPE device, and sample or acquire an operation feature of each of buses. The at least one monitoring unit or a cloud server is configured to: determine whether a change in the operation feature meets a predetermined change condition, and detect a state of the at least one MLPE device with the MLPE device detection method for an MLPE photovoltaic system in the first aspect.

In an embodiment, in the MLPE photovoltaic system, the MLPE device is an optimizer, a shutdown device or a micro inverter, and the direct-current source is a photovoltaic module.

In an embodiment, in the MLPE photovoltaic system, in a case that the MLPE device is the optimizer or the shutdown device, the monitoring unit is an independent device or a controller in a photovoltaic inverter connected to each of the buses at a direct-current side; and in a case that the MLPE device is the micro inverter, the monitoring unit is an independent device.

In an embodiment, in the MLPE photovoltaic system, in a case that the MLPE device is the micro inverter, the monitoring unit is arranged in an alternating-current combiner box and is communicatively connect to an intelligent electric meter in the alternating-current combiner box to obtain an operation feature of an alternating-current bus.

In an embodiment, in the MLPE photovoltaic system, the MLPE device is an energy storage management unit, and the direct-current source is an energy storage battery.

In an embodiment, in the MLPE photovoltaic system, a number list of the at least one MLPE device is preset in the monitoring unit, and the number list includes the positioning number and an installation position of the at least one MLPE device.

In an embodiment, in the MLPE photovoltaic system, in a case that the MLPE device is the optimizer or the shutdown device, the output terminal of the at least one MLPE device is connected in series to a direct-current bus in the MLPE photovoltaic system; and in a case that the MLPE device is the micro inverter, the output terminal of the at least one MLPE device is connected in parallel to the alternating-current bus in the MLPE photovoltaic system.

In the MLPE device detection method for an MLPE photovoltaic system according to the present disclosure, for each of MLPE devices, an output terminal of the MLPE device is connected to a bus corresponding to the MLPE device in the MLPE photovoltaic system, and the MLPE device is configured with a positioning number. The MLPE device detection method includes a detection process to be performed at least once. The detection process includes: controlling an MLPE device with a positioning number to perform operation state switching, and acquiring an operation feature of a bus corresponding to the MLPE device before the operation state switching and an operation feature of the bus corresponding to the MLPE device after the operation state switching; determining whether a change, between the operation feature of the bus corresponding to the MLPE device before the operation state switching and the operation feature of the bus corresponding to the MLPE device after the operation state switching, meets a predetermined change condition; and in a case that the change does not meet the predetermined change condition, determining that the MLPE device with the positioning number operates in an abnormal state. With the MLPE device detection method for an MLPE photovoltaic system according to the present disclosure, an operation state of an MLPE device with a specific number in the MLPE photovoltaic system may be actively detected, thereby detecting an operation state of each of the MLPE devices in the MLPE photovoltaic system. Compared with the conventional operation, maintenance and detection solutions for MLPE devices, according to the present disclosure, it is unnecessary for the technical personnel to detect each of the MLPE devices on site, reducing the time for operation and maintenance of devices, reducing the cost for operation, maintenance and troubleshooting, and reducing the difficulty of on-site troubleshooting. In addition, the MLPE device detection method for an MLPE photovoltaic system according to the present disclosure is flexible, and various types of states can be detected.

BRIEF DESCRIPTION OF THE DRAWINGS

In order to more clearly illustrate the technical solutions of embodiments of the present disclosure or in the conventional technology, drawings to be used in the description of the embodiments or the conventional technology are briefly described hereinafter. It is apparent that the drawings in the following description show only some embodiments of the present disclosure. Those skilled in the art can obtain other drawings based on the structures shown in these drawings without any creative efforts.

DETAILED DESCRIPTION

Technical solutions of embodiments of the present disclosure are clearly and completely described hereinafter in conjunction with the drawings of the embodiments of the present disclosure. Apparently, the described embodiments are only a part of the embodiments of the present disclosure, rather than all embodiments. Other embodiments obtained by those skilled in the art without any creative efforts based on the embodiments of the present disclosure fall within the protection scope of the present disclosure.

Figure 1:
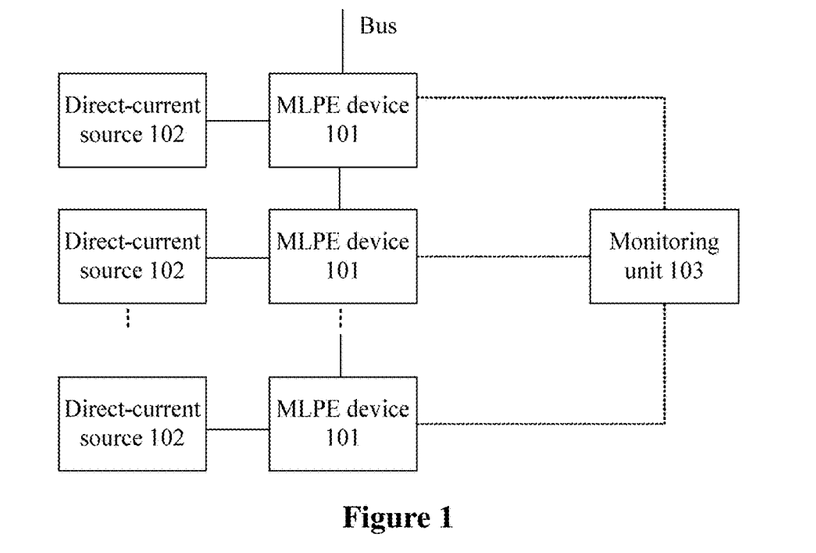
FIG. 1 is a schematic structural diagram of an MLPE photovoltaic system according to an embodiment of the present disclosure.

An MLPE photovoltaic system is provided according to an embodiment of the present disclosure. As shown in FIG. 1, the MLPE photovoltaic system includes: at least one MLPE device 101, at least one direct-current source 102, and at least one monitoring unit 103. For each of the at least one MLPE device 101, an input terminal of the MLPE device 101 is connected to the at least one direct-current source 102, and an output terminal of the MLPE device 101 is connected to a bus corresponding to the MLPE device 101 in the MLPE photovoltaic system.

Figure 2:
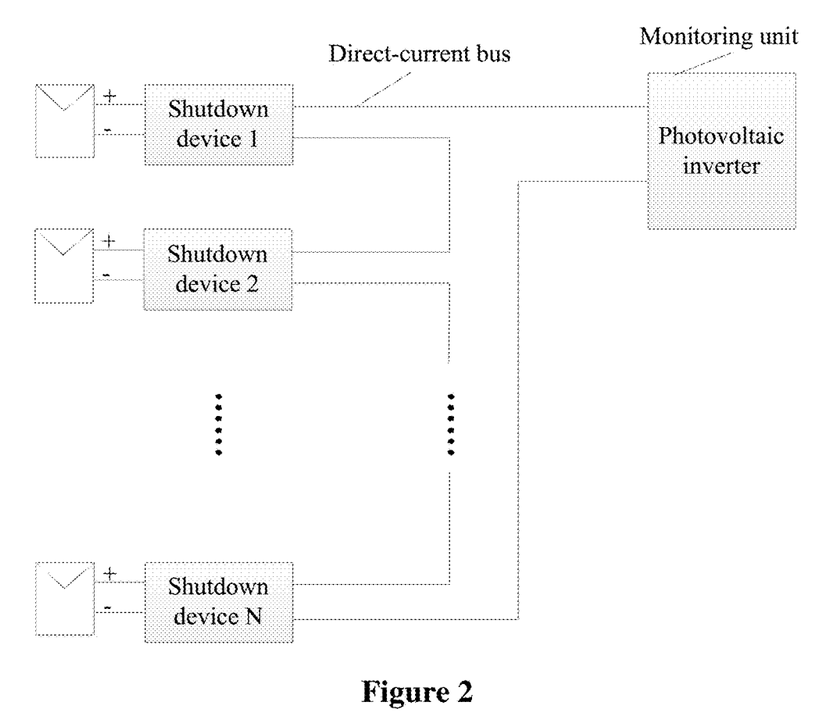
FIG. 2 is a schematic structural diagram of an MLPE photovoltaic system according to another embodiment of the present disclosure.
Figure 4:
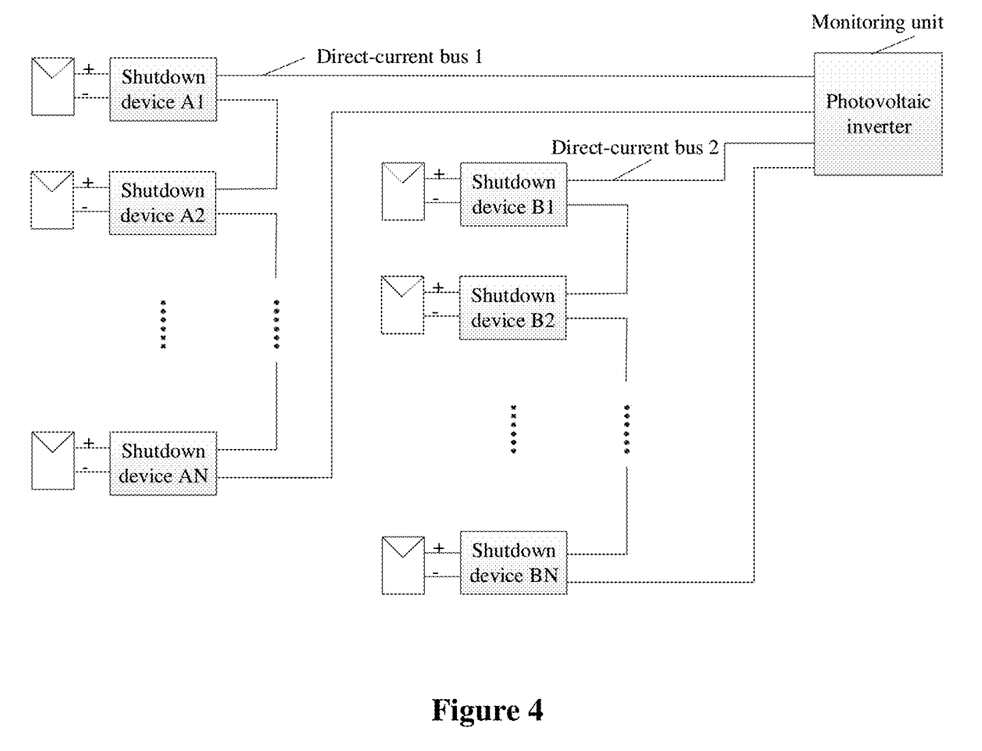
FIGS. 4 and 5 are schematic structural diagrams of an MLPE photovoltaic system according to two embodiments of the present disclosure.
Figure 5:
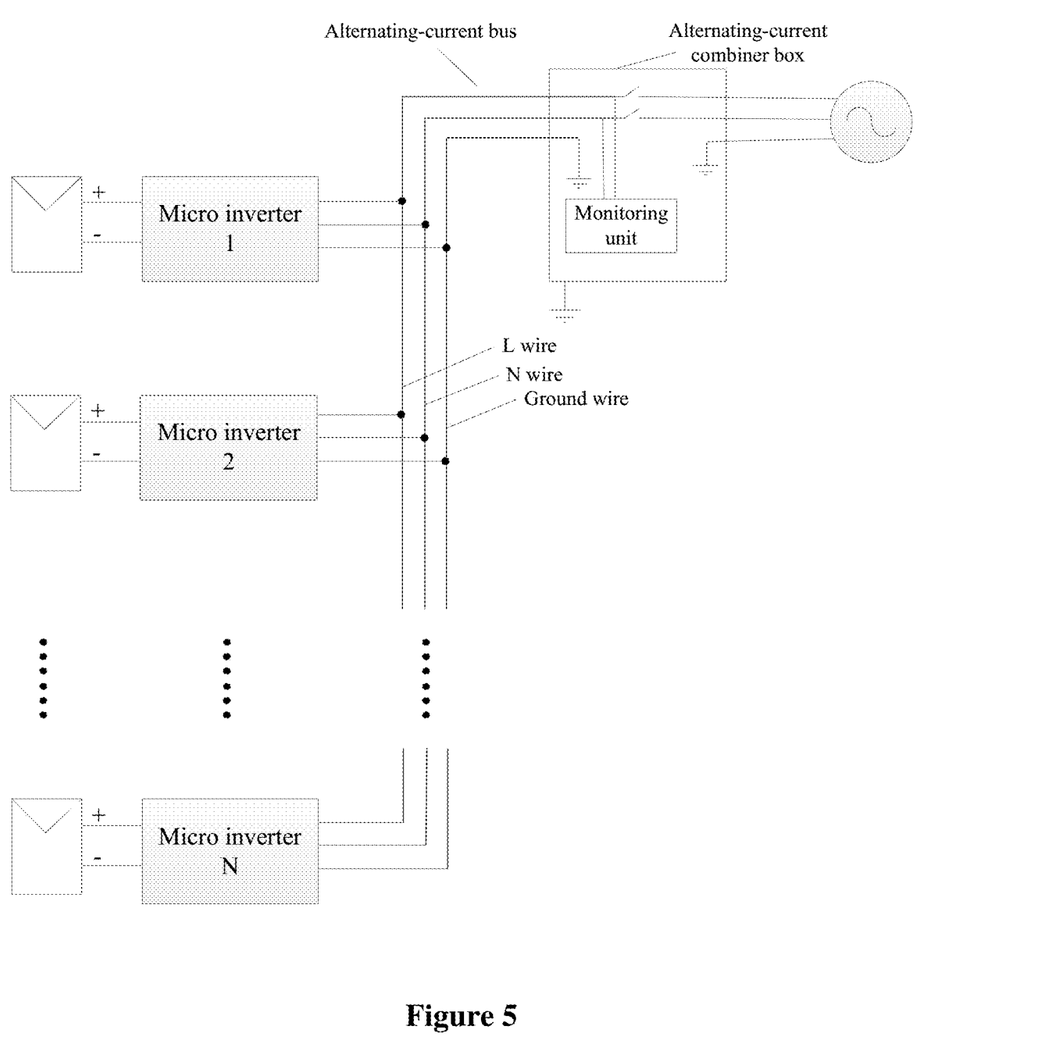

In practices, the MLPE device 101 may be an optimizer, a shutdown device (as shown in FIG. 2 or FIG. 4), or a micro inverter (as shown in FIG. 5). The direct-current source 102 may be a photovoltaic module (as shown in FIGS. 2, 4, and 5). Apparently, the MLPE device 101 may be a conventional MLPE device, and the direct-current source 102 may be a conventional direct-current source. The type of the MLPE device 101 and the type of the direct-current source 102 are not limited in the present disclosure, and all implementations fall within the protection scope of the present disclosure.

It should be noted that in a case that the MLPE device 101 is the optimizer or the shutdown device, the output terminal of the at least one MLPE devices 101 is connected in series to a bus corresponding to the at least one MLPE device in the MLPE photovoltaic system, as shown in FIG. 2 or FIG. 4. In a case that the MLPE device 101 is the micro inverter, the output terminal of the at least one MLPE device is connected in parallel to a bus corresponding to the at least one MLPE device in the MLPE photovoltaic system, as shown in FIG. 5.

In practices, in a case that the MLPE device 101 is the shutdown device, the bus corresponding to the MLPE device 101 is a direct-current bus, as shown in FIG. 2 or FIG. 4. In a case that the MLPE device 101 is the micro inverter, the bus corresponding to the MLPE device 101 is an alternating-current bus, as shown in FIG. 5.

It should further be noted that in a case that the MLPE photovoltaic system is a large-scale MLPE photovoltaic system including shutdown devices, the MLPE photovoltaic system includes multiple direct-current buses (a direct-current bus 1, a direct-current bus 2, . . . in FIG. 4), and multiple shutdown devices are connected in series to each of the direct-current buses. In a case that the MLPE photovoltaic system is a small-scale MLPE photovoltaic system including shutdown devices, the MLPE photovoltaic system may only include one direct-current bus (the direct-current bus as shown in FIG. 2), and the multiple shutdown devices are connected in series to the direct-current bus.

Each of the at least one MLPE device 101 is configured with a positioning number.

In practices, the technical personnel may record an installation position of each of the at least one MLPE device 101 based on the positioning number of the at least one MLPE device 101, thus a number list for the at least one MLPE device 101 is obtained.

Figure 3:
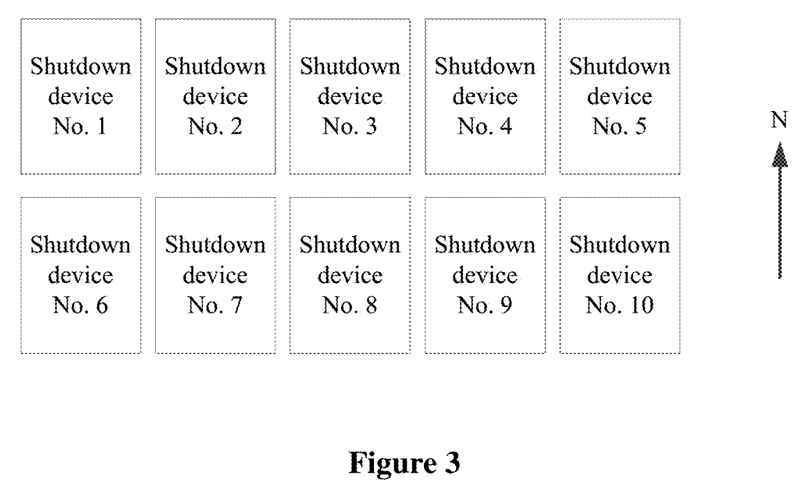
FIG. 3 is a schematic diagram showing installation positions of MLPE devices in an MLPE photovoltaic system according to an embodiment of the present disclosure.

It should be noted that assuming that the number of the MLPE devices 101 being shutdown devices shown in FIG. 2 is 10, that is, N=10, positioning numbers and installation positions of the shutdown devices in the MLPE photovoltaic system may be as shown in FIG. 3. The positioning number of the MLPE device 101 may be determined according to application environments and the user's requirements, which is not limited in the present disclosure and falls within the protection scope of the present disclosure.

Each of the at least one MLPE device 101 is communicatively connected to the monitoring unit 103.

In practices, each of the at least one MLPE device 101 performs communication with the monitoring unit 103 to perform data transmission. The communication includes but is not limited to power line carrier communication, wireless communication, or 485 communication, which is determined according to specific application environments and falls within the protection scope of the present disclosure.

The data transmission between the MLPE device 101 and the monitoring unit 103 generally includes one-way data transmission and dual-way data transmission. In the one-way data transmission, the MLPE device 101, such as the shutdown device in FIG. 2 or FIG. 4, can only receive data from the monitoring unit 103 and cannot transmit data to the monitoring unit 103. In the dual-way data transmission, the MLPE device 101, such as the micro inverter shown in FIG. 5, may receive data from the monitoring unit 103 and transmit data to the monitoring unit 103.

It should be noted that in practices, the MLPE device 101 with one-way data transmission has a hardware cost advantage over the MLPE device 101 with dual-way data transmission.

In practices, in a case that the MLPE device 101 is the optimizer or the shutdown device, the monitoring unit 103 may be an independent device, or the monitoring unit 103 may be a controller in a photovoltaic inverter connected to each of the buses at a direct-current side, that is, the monitoring unit 103 is integrated in a photovoltaic inverter shown in FIG. 2 or FIG. 4. In a case that the MLPE device 101 is the micro inverter, the monitoring unit 103 is an independent device (as shown in FIG. 5). That is, the monitoring unit 103 may be an independent device or a power supply device with a communication function.

It should be noted that in a case that the monitoring unit 103 is the controller in the photovoltaic inverter connected to each of the buses at the direct-current side, each of photovoltaic modules in the MLPE photovoltaic system may correspond to one shutdown device, as shown in FIG. 2 or FIG. 4. Alternatively, multiple photovoltaic modules may correspond to one shutdown device, which is determined according to application environments and falls within the protection scope of the present disclosure. Moreover, in a case that the monitoring unit 103 is integrated in the photovoltaic inverter, the photovoltaic inverter may communicate with each of the shutdown devices through a power line carrier.

Similarly, each of the photovoltaic modules in the MLPE photovoltaic system may correspond to one micro inverter or multiple photovoltaic modules may correspond to a same micro inverter, which is determined according to application environments and falls within the protection scope of the present disclosure.

It should be further noted that in a case that the MLPE device 101 is the micro inverter, the monitoring unit 103, as an independent device, may be coupled to an alternating-current bus to which an output terminal of the micro inverter is connected, or the monitoring unit 103 may be arranged in an alternating-current combiner box and is communicatively connect to an intelligent electric meter in the alternating-current combiner box to obtain an operation feature of an alternating-current bus, as shown in FIG. 5.

In practices, the MLPE device 101 may be an energy storage management unit, and the direct-current source 102 may be an energy storage battery. The structures and specific explanations of the energy storage management unit and the energy storage battery may refer to the conventional technology, and are not repeated herein.

The monitoring unit 103 may independently control the at least one MLPE device 101, and sample or acquire an operation feature of each of the buses. Moreover, the monitoring unit 103 or a cloud server may be configured to: determine whether a change in the operation feature meets a predetermined change condition, and detect a state of the at least one MLPE device 101 with an MLPE device detection method for an MLPE photovoltaic system according to the following embodiments.

It should be noted that a number list for the at least one MLPE devices 101 may be preset in the monitoring unit 103, and the number list includes a positioning number and an installation location of each of the at least one MLPE device 101.

In practices, based on the preset positioning number for each of the at least one MLPE device 101, an installation position of an MLPE device 101 may be acquired by querying the number list, so that an installation position of an MLPE device that abnormally operates may be determined, and then an alarm signal may be outputted for prompting the maintenance personnel to repair the MLPE device.

For the MLPE photovoltaic system described above, an MLPE device detection method for an MLPE photovoltaic system is further provided according to an embodiment of the present disclosure, to solve the problems of excessive time required for the technical personnel to detect each of MLPE devices on site and high costs for operation, maintenance and troubleshooting according to the conventional operation, maintenance and detection solutions for MLPE devices.

Figure 6:
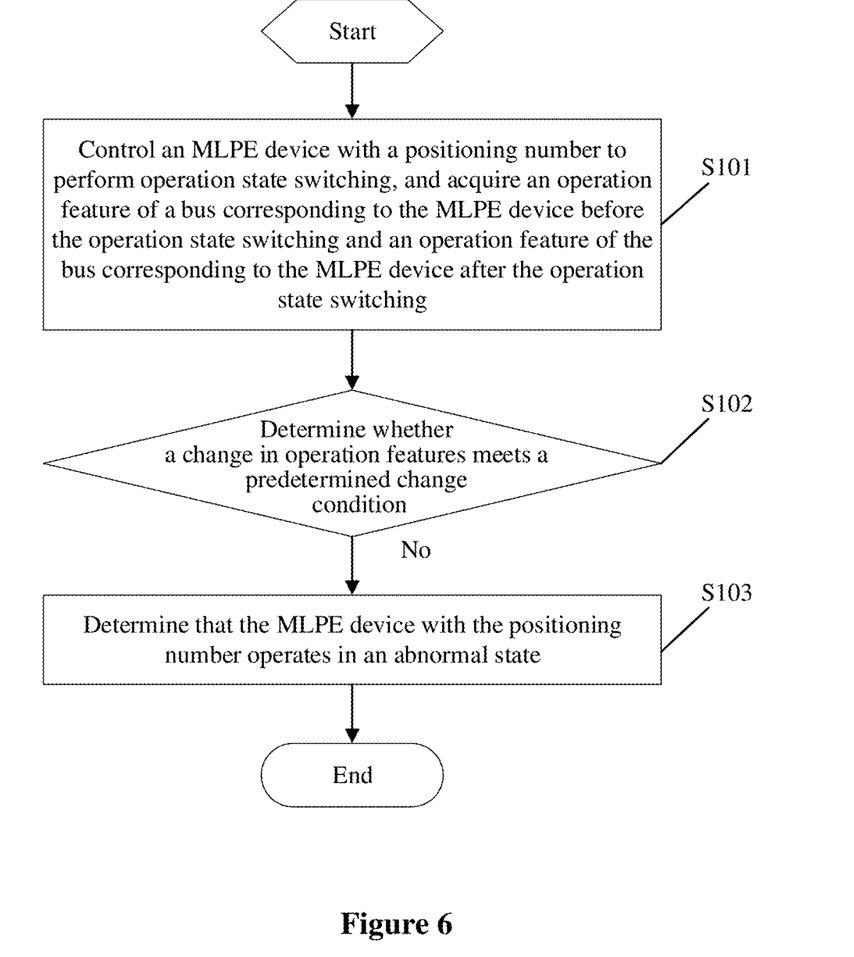
FIGS. 6 to 9 are flow charts of an MLPE device detection method for an MLPE photovoltaic system according to four embodiments of the present disclosure

In practices, the MLPE device detection method for an MLPE photovoltaic system includes a detection process to be performed at least once. As shown in FIG. 6, the detection process includes the following steps S101 to S103.

In step S101, an MLPE device with a positioning number is controlled to perform operation state switching, and an operation feature of a bus corresponding to the MLPE device before the operation state switching and an operation feature of the bus corresponding to the MLPE device after the operation state switching are acquired.

In practices, the MLPE device with the positioning number may be controlled to perform operation state switching by: transmitting a control command to the MLPE device with the positioning number.

The control command may be a turning on command or a turning off command for a shutdown device or an optimizer, or the control command may be an outputting active power command, an outputting reactive power command, or a shutdown command for a micro inverter, which is determined according to application environments and the user's requirements and falls within the protection scope of the present disclosure.

It should be noted that for a shutdown device operating in a normal state, the shutdown device operates in a turn-on state after receiving the turning on command and operates in a turn-off state after receiving the turning off command. For a micro inverter operating in a normal state, the micro inverter operates in a corresponding state after receiving a control command. For example, the micro inverter outputs an active power after receiving the outputting active power command, and shuts down after receiving the shutdown command.

In practices, in a case that the control command is the turning on command or the turning off command, the operation feature of the bus is a bus voltage. In a case that the control command is the outputting active power command, the outputting reactive power command or the shutdown command, the operation feature of the bus is an output power. Specifically, the output power corresponding to the outputting active power command is an active power, and the output power corresponding to the outputting reactive power command is a reactive power.

In step S102, it is determined whether a change, between the operation feature of the bus corresponding to the MLPE device before the operation state switching and the operation feature of the bus corresponding to the MLPE device after the operation state switching, meets a predetermined change condition.

In practices, different operation features of the MLPE device correspond to different operation features of the bus. Therefore, a change in the operation feature of the bus may be acquired by switching the operation state of the MLPE device, and then the operation state of the MLPE device is determined.

In a case that the MLPE device is the shutdown device, after the shutdown device is controlled to be turned on, it is determined whether a bus voltage is increased. In a case that the bus voltage is not increased, it is determined that the change in the operation feature does not meet the predetermined change condition. After the shutdown device is controlled to be turned off, it is determined whether a bus voltage is reduced. In a case that the bus voltage is not reduced, it is determined that the change in the operation feature does not meet the predetermined change condition.

Taking the MLPE photovoltaic system shown in FIG. 2 as an example, it is assumed that the MLPE photovoltaic system includes 10 photovoltaic modules, an output voltage of each of the photovoltaic modules is 40V, and a voltage of a direct-current bus is 400V. After the photovoltaic inverter transmits the turning off command to a shutdown device with a number of 1, in a case that the photovoltaic inverter detects that the voltage of the direct-current bus is reduced, for example, the voltage of the direct-current bus is reduced to 360V, it is determined that the shutdown device with the number of 1 operates in a normal state; and in a case that the photovoltaic inverter detects that the voltage of the direct-current bus is unchanged, that is, the voltage of the direct-current bus is still 400V, it is determined that the shutdown device with the number of 1 operates in an abnormal state.

In a case that the MLPE device is the micro inverter, after the micro inverter is controlled to output an active power or a reactive power, it is determined whether a corresponding output power is generated on a bus corresponding to the micro inverter. In a case that no output power is generated on the bus corresponding to the micro inverter, it is determined that the change in the operation feature does not meet the predetermined change condition.

In a case that the micro inverter is controlled to be shut down, it is determined whether an output power generated on a bus corresponding to the micro inverter is equal to zero. In a case that the output power is not equal to zero, it is determined that the change in the operation feature does not meet the predetermined change condition.

In practices, after it is determined whether the change between the operation features meets the predetermined change condition in the step S102 and the change does not meet the predetermined change condition, proceed to step S103.

In step S103, it is determined that the MLPE device with the positioning number operates in an abnormal state.

In practices, after it is determined whether the change between the operation features meets the predetermined change condition in the step S102, it may be determined that an MLPE device, corresponding to the bus with the change between the operation features not meeting the predetermined change condition, operates in the abnormal state.

It should be noted that the reason for the shutdown device operating in the abnormal state may be a failure of a communication module or a failure of an internal circuit. The reason for the optimizer operating in the abnormal state, or the micro inverter operating in the abnormal state or the energy storage management unit operating in the abnormal state may refer to the conventional technology, and is not repeated in the present disclosure.

With the MLPE device detection method for an MLPE photovoltaic system according to the embodiments of the present disclosure, the above processes are performed, and an operation state of an MLPE device with a specific number in the MLPE photovoltaic system may be actively detected, thereby detecting an operation state of each of the MLPE devices in the MLPE photovoltaic system. Compared with the conventional operation, maintenance and detection solutions for MLPE devices, according to the present disclosure, it is unnecessary for the technical personnel to detect each of the MLPE devices on site, reducing the time for operation and maintenance of devices, reducing the cost for operation, maintenance and troubleshooting, and reducing the difficulty of on-site troubleshooting. In addition, the MLPE device detection method for an MLPE photovoltaic system according to the present disclosure is flexible, and various types of states can be detected.

It should be noted that in practices, the micro inverter, that may perform dual-way data transmission with the monitoring unit actively, transmits state information of the micro inverter to the monitoring unit in response to a control command from the monitoring unit, and the monitoring unit in a normal state may communication with the micro inverter to acquire the state information, such as temperature, a voltage, a power and cumulative power generation capacity, of the micro inverter. Therefore, the monitoring unit can detect the micro inverter by using the MLPE device detection method for an MLPE photovoltaic system according to the present disclosure, and can determine whether the micro inverter operates in a normal state based on data reported by the micro inverter and an operation feature of a bus corresponding to the micro inverter, thereby performing detection on the micro inverter.

Figure 7:
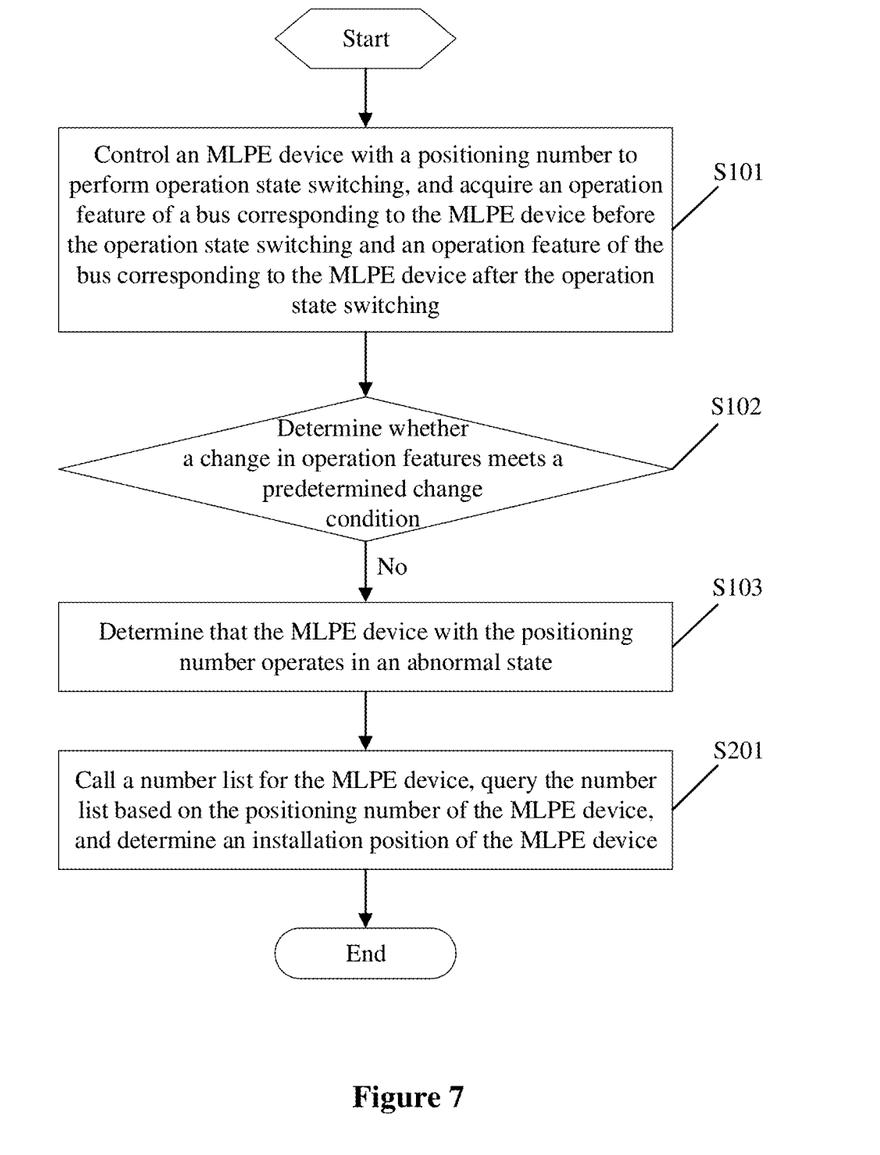

In another embodiment according to the present disclosure, after it is determined that the MLPE device with the positioning number operates in the abnormal state in the step S103, as shown in FIG. 7, the MLPE device detection method for an MLPE photovoltaic system further includes the following step S201.

In step S201, a number list for the MLPE devices is called, the number list is queried based on the positioning number of the MLPE device, and an installation position of the MLPE device is determined.

In practices, a preset number list for the MLPE devices may be called from the monitoring unit. Since each of the MLPE devices corresponds to a positioning number, the number list may be queried based on the positioning number of the MLPE device to determine an installation position of the MLPE device.

In the MLPE device detection method for an MLPE photovoltaic system according to the embodiment, after it is determined that an MLPE device with a positioning number operates in an abnormal state, a number list for the MLPE devices may be called, and then an installation position of the MLPE device may be obtained based on the positioning number of the MLPE device, so that the device in the abnormal state is quickly located and the maintenance personnel is prompted based on a location result, thereby reducing the difficulty of on-site troubleshooting and improving maintenance efficiency.

Figure 8:
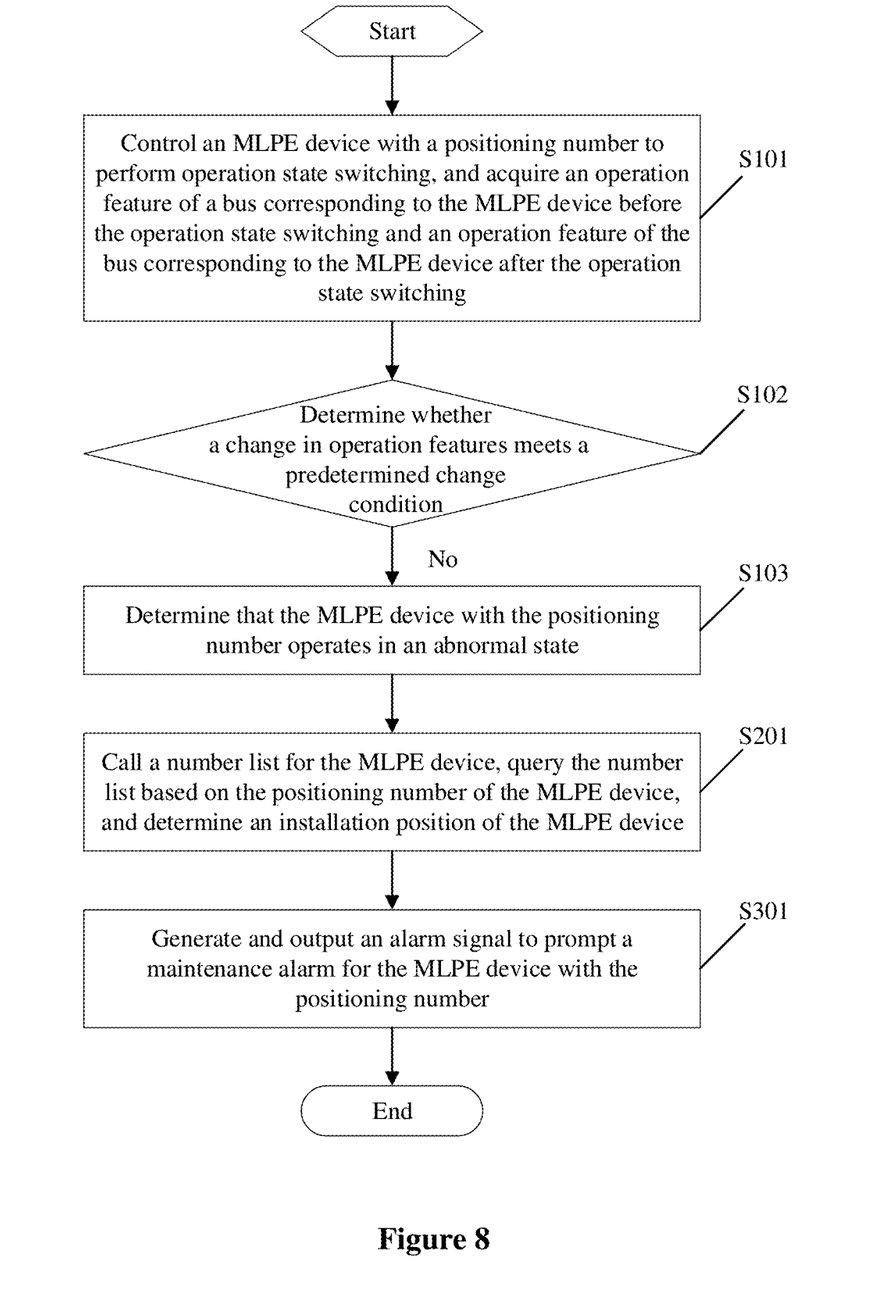

In practices, after the number list is queried based on the positioning number of the MLPE device to determine the installation position of the MLPE device in the step S201, as shown in FIG. 8, the MLPE device detection method for an MLPE photovoltaic system further includes the following step S301.

In step S301, an alarm signal is generated and outputted to prompt a maintenance alarm for the MLPE device with the positioning number.

The form of the alarm signal may be determined according to specific application environments and the user's requirements, and is not limited to a sound alarm signal and/or a text alarm signal.

It should be noted that in a case that the photovoltaic inverter in the MLPE photovoltaic system may be connected to a cloud processor, the photovoltaic inverter, after detecting all the shutdown devices in the MLPE photovoltaic system, may determine a shutdown device operating in an abnormal state and report the shutdown device to the cloud processor, and then the cloud processor outputs an alarm signal to notify the maintenance personnel for maintenance.

Figure 9:
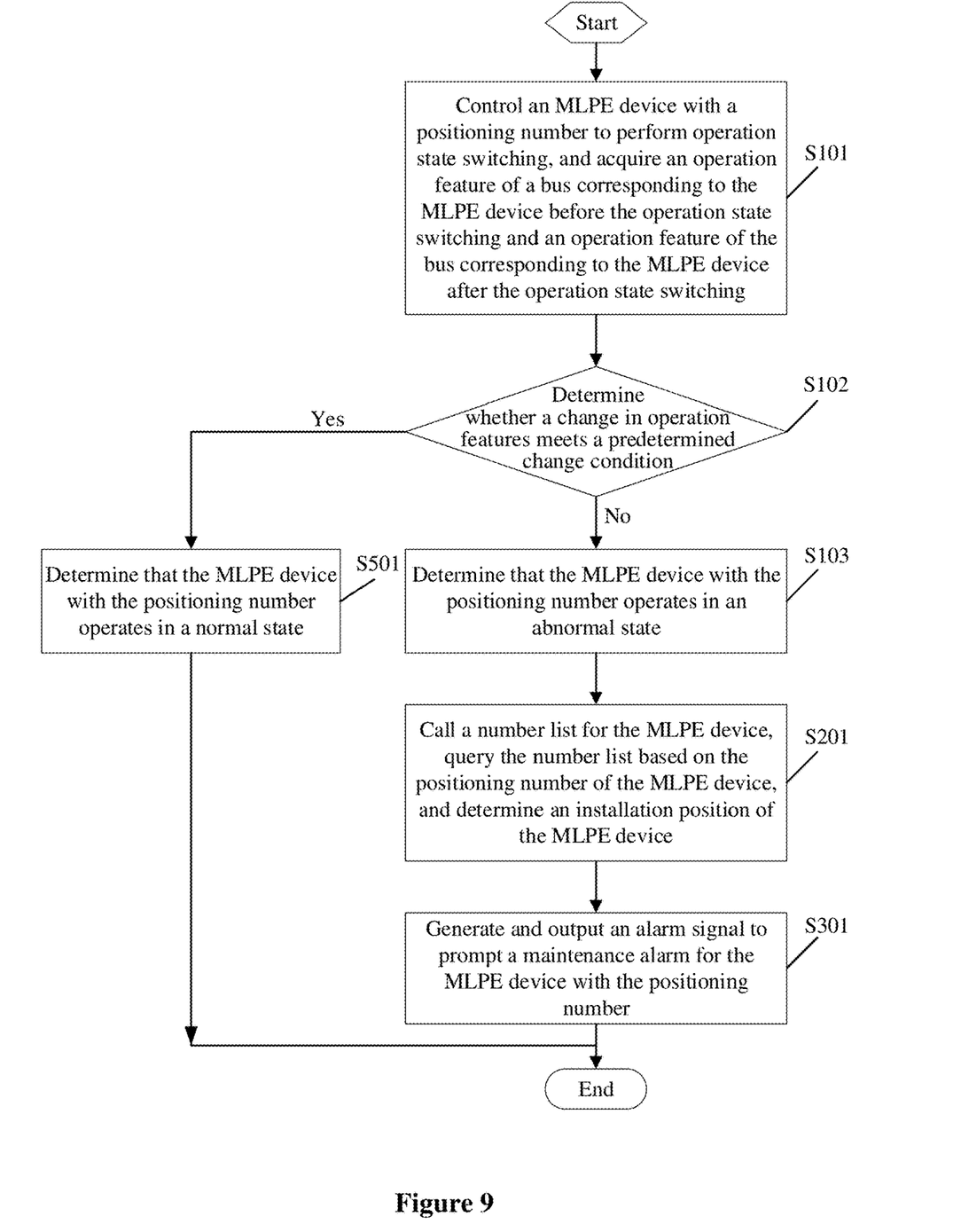

In another embodiment of the present disclosure, after it is determined whether the change in the operation features meets the preset change condition in the step S102, in a case that the change in the operation features meets the preset change condition, as shown in FIG. 9, the MLPE device detection method for an MLPE photovoltaic system further includes the following step S501.

In step S501, it is determined that the MLPE device with the positioning number operates in a normal state.

In practices, after it is determined whether the change in the operation features meets the preset change condition in step S102, it may be determined that an MLPE device, corresponding to a bus with the change in the operation features meeting the preset change condition, operates in a normal state.

In another embodiment of the present disclosure, before the detection process is performed for a first time, the MLPE device detection method for an MLPE photovoltaic system further includes: receiving a detection command.

The detection command may be periodically transmitted by a cloud processor or transmitted by a local control device on-site.

That is, the photovoltaic inverter may be periodically triggered by a cloud processor or be triggered by the maintenance personnel through a local control device to perform the MLPE device detection method for an MLPE photovoltaic system. The solution, that the photovoltaic inverter is periodically triggered by the cloud processor to perform the MLPE device detection method for an MLPE photovoltaic system, is suitable for a scenario of routine detection of operation and maintenance, and the solution, that the photovoltaic inverter is triggered by the maintenance personnel through the local control device to perform the MLPE device detection method for an MLPE photovoltaic system, is suitable for a scenario of temporary on-site detection.

In practices, the cloud processor may be a PC, a cloud server of the monitoring unit, or an upper computer of the monitoring unit, which is not limited in the present disclosure and falls within the protection scope of the present disclosure.

It should be noted that in practices, the monitoring unit may be communicatively connected to the PC through a network cable or in a wireless manner, or may be communicatively connected to the cloud server. The cloud processor may acquire state information from the micro inverter in real time through a communication channel with the monitoring unit, and determines a micro inverter operating in an abnormal state based on acquired data.

Based on the MLPE device detection method for an MLPE photovoltaic system described above, in practices, at least one MLPE device may be detected in the detection process to be performed at least once.

It should be understood that in a case that the MLPE photovoltaic system includes multiple MLPE devices, at least one MLPE device is detected in a detection process.

For example, for the MLPE photovoltaic system shown in FIG. 2, it is assumed that the number of the shutdown device in the MLPE photovoltaic system is 10, that is, N=10. In a case that it is required to perform the detection process 10 times, the number of the MLPE device detected in each detection process is 1. In a case that it is required to perform the detection process less 10 times, the number of the MLPE device detected in at least one detection process is greater 1.

Preferably, in practices, for MLPE devices connected to a same bus, the MLPE device detection method may include: performing a troubleshooting process at least once, and the troubleshooting process includes performing the detection process at least once.

The troubleshooting process is performed by dividing MLPE devices in an MLPE photovoltaic system in different groups in a certain manner and performing a detection process on MLPE devices in each of the groups. The MLPE devices may be divided in a bisection manner, the number of times that the troubleshooting process is performed is determined, and the MLPE devices in the MLPE photovoltaic system are detected by performing the detection process a minimum number of times. Apparently, the number of times that the troubleshooting process is to be performed and the number of times that the detection process is to be performed may be determined according to specific application environments and the user's requirements, which is not limited in the present disclosure and falls within the protection scope of the present disclosure.

Assuming that the detection process is performed on the MLPE photovoltaic system shown in FIG. 2, the troubleshooting process may be performed as follows. For example, the number of the shutdown devices in the MLPE photovoltaic system is ten. A first troubleshooting process includes: performing a detection process simultaneously on the ten shutdown devices. In a case that it is determined that the shutdown devices operate in the abnormal state in the first troubleshooting process, a second troubleshooting process is performed. If the shutdown devices are divided in the bisection manner, the ten shutdown devices may be divided into two groups in the second troubleshooting process, and a detection process is respectively performed on five shutdown devices in each of the groups. In a case that it is determined that only shutdown devices in a second group operate in the abnormal state in the second troubleshooting process, a third troubleshooting process is performed on the shutdown devices in the second group. In the third troubleshooting process, a detection process may be respectively performed on each of the five shutdown devices in the second group to determine a shutdown device operating in the abnormal state.

Specifically, for the MLPE devices connected to the same bus, the MLPE device detection method include: performing the troubleshooting process multiple times. In a case that a detection result of at least one detection process in a troubleshooting process indicates an abnormal state, it is required to perform a subsequent troubleshooting process to perform fewer detection processes on all MLPE devices involved in the detection process. That is, in adjacent two troubleshooting processes, for an MLPE device operating in the abnormal state determined in a detection process in a troubleshooting process, a detection process is performed on the MLPE device in a subsequent troubleshooting process; and the number of MLPE devices detected in the detection process in the subsequent troubleshooting process is less than or equal to the number of MLPE devices detected in the detection process in the troubleshooting process. Still taking the MLPE photovoltaic system shown in FIG. 2 as an example, in a case that the detection process is only performed once in the first troubleshooting process and it is determined that a shutdown device operating in the abnormal state exists in the ten shutdown devices, a detection process in a second troubleshooting process is performed on all the ten shutdown devices. In the second troubleshooting process, the ten shutdown devices are divided into two groups, and the detection process is respectively performed once on each of the two groups. That is, the number of the shutdown devices detected in the second troubleshooting process is 5*2, which is equal to the number 10 of the shutdown devices detected in the detection processes in the second troubleshooting process. In a third troubleshooting process, a detection process is respectively performed on each of five shutdown devices in a second group that operate in the abnormal state. That is, the number of the shutdown devices detected in the third troubleshooting process is 5, which is less than the number 10 of the shutdown devices detected in the detection processes in the second troubleshooting process.

Further, in a first troubleshooting process, a detection process is performed on all the MLPE devices connected to the same bus once, performing a one-time unified detection on all the MLPE devices connected to the same bus. If none of the MLPE devices operates in the abnormal state, it is unnecessary to perform a second troubleshooting process, thereby minimizing the number of times of the detection processes. In a last troubleshooting process, the detection process is performed on only one MLPE device, so that the detection result indicating the abnormal state corresponds to a single MLPE device, ensuring the accuracy of detection.

In practices, as shown in FIG. 4, the MLPE photovoltaic system includes multiple buses, and each of the buses (that is, a direct-current bus 1 and a direct-current bus 2 in FIG. 4) is a direct-current bus. In a case that for each of the buses, multiple shutdown devices are connected in series to the bus, a detection process is performed on the multiple shutdown devices connected to each of the buses in a first troubleshooting process to determine whether a shutdown device operating in an abnormal state exists among the shutdown devices connected to each of the buses. It is assumed that after performing the detection process on the shutdown devices (including a shutdown device A1, a shutdown device A2, . . . , and a shutdown device AN) connected to the direct-current bus 1, it is determined that no shutdown device operating in the abnormal state exists in the shutdown devices connected to the direct-current bus 1, and after performing the detection process on the shutdown devices (including a shutdown device B1, a shutdown device B2, . . . , and a shutdown device BN) connected to the direct-current bus 2, it is determined that a shutdown device operating in the abnormal state exists in the shutdown devices connected to the direct-current bus 2. Then, the troubleshooting process is performed multiple times on the shutdown devices connected to the direct-current bus 2 or the detection process is performed multiple times on the shutdown devices connected to the direct-current bus 2, and finally the shutdown device operating in the abnormal state and connected to the direct-current bus 2 is determined in a last troubleshooting process in which the detection process is performed on only one MLPE device.

It should be noted that in practices, the photovoltaic inverter in the MLPE photovoltaic system may transmit a control command to shutdown devices connected to the direct-current bus 1 or shutdown devices connected to the direct-current bus 2 to determine operations of the shutdown devices connected to the direct-current buses, thereby determining the direct-current bus to which a shutdown device operating in an abnormal state is connected. Assuming that a turning off command is transmitted to the shutdown devices connected to the direct-current bus 1, if it is detected that a voltage of the direct-current bus 1 is lower than a predetermined value after transmitting the turning off command, it is determined that the shutdown devices connected to the direct-current bus 1 operate normally; and if it is detected that the voltage of the direct-current bus 2 is higher than the predetermined value after transmitting the turning off command, it is determined that at least one of the shutdown devices connected to the direct-current bus 2 operates abnormally. Specifically, the predetermined value may be a voltage value slightly higher than 0V, such as 5V or 10V. Then, the photovoltaic inverter respectively transmits a the turning off command to each of the shutdown devices with numbers connected to the direct-current bus 2 until all the shutdown devices connected to the direct-current bus 2 are detected, and then a detection result is obtained, for example, a shutdown device B2 operates abnormally is determined.

In practices, in conjunction with FIG. 5, the MLPE photovoltaic system includes a bus and the bus is an alternating-current bus. In a case that multiple micro inverters are connected in series to the alternating-current bus, in a first troubleshooting process, a detection process is performed on the multiple micro inverters connected to the alternating-current bus to determine whether a micro inverter operating abnormally exists among the micro inverters connected to the alternating-current bus. In a case that a micro inverter operating abnormally exists among the micro inverters connected to the alternating-current bus, multiple troubleshooting processes or multiple detection processes are performed on the micro inverters connected to the alternating-current bus, and then a last troubleshooting process in which the detection process is performed on only one micro inverter is performed to determine the abnormally operating micro inverter connected to the alternating-current bus.

In addition, in a case that a detection result indicating an abnormal state is obtained in the first troubleshooting process, the number of MLPE devices to be detected in each of the detection processes may be gradually reduced until only one MLPE device is to be detected in a detection process. Alternatively, a last troubleshooting process in which only one MLPE device is detected may be performed. The number of the troubleshooting process is not limited and is determined according to the application environments, which is fall within the protection scope of the present disclosure. Moreover, in practices, in a case that multiple troubleshooting processes are performed, the MLPE devices, to be detected in detection processes in adjacent two troubleshooting processes, may be divided in other manners than the bisection manner, which is determined according to the application environments and falls within the protection scope of the present disclosure.

It should be further noted that compared to respectively performing a detection process on each of MLPE devices in an MLPE photovoltaic system, with the MLPE device detection method for an MLPE photovoltaic system in which multiple troubleshooting processes are performed, the detection processes can be optimized, the detection time is saved, thereby improving the detection speed.

In practices, the MLPE device detection method is not limited to performing two troubleshooting processes or performing multiple troubleshooting processes described above. For the MLPE devices connected to the same bus, the MLPE device detection method may include: performing the troubleshooting process once, where the troubleshooting process includes multiple detection processes, and only one MLPE device is detected in each of the detection processes. That is, a detection process may be performed on each of the MLPE devices to directly determine an MLPE device operating in an abnormal state.

In this way, taking FIG. 5 as an example, in the MLPE device detection method in the MLPE photovoltaic system, the number of the troubleshooting processes and the detail troubleshooting processes are described as follows.

The troubleshooting process is performed on the MLPE photovoltaic system only once. The troubleshooting process includes: sorting the micro inverters in the MLPE photovoltaic system in a detection order, and performing a detection process on the sorted micro inverters sequentially to determine a state of each of the micro inverters.

Taking FIG. 2 as an example, in the MLPE device detection method in the MLPE photovoltaic system, the number of rounds of the troubleshooting processes and the detail troubleshooting processes are described as follows.

The troubleshooting process is performed on the MLPE photovoltaic system only once. The troubleshooting process includes: performing a detection process on the shutdown devices in the MLPE photovoltaic system according to a sequence of the positioning numbers of the shutdown devices to determine a state of each of the shutdown devices. For example, according to a sequence of the positioning numbers from small to large or from large to small, the detection process is performed on each of the shutdown devices with positioning numbers 1, 2, . . . , N.

It should be noted that the ways in which the detection process is performed on the MLPE devices in the MLPE photovoltaic system may be determined according to the application environments and the user's requirements, which are not limited in the present disclosure and fall within the protection scope of the present disclosure.

Features described in various embodiments in this specification may be replaced or combined with each other. The same or similar parts among the embodiments may be referred to each other, and each of the embodiments emphasizes the differences from others. In particular, since the system or the system embodiments are similar to the method embodiments, the description thereof is relatively simple, and reference may be made to the description of the method embodiments for relevant matters. The foregoing system and the embodiments of the system are only schematic. A unit described as a separated component may be or may not be physically separated. Components shown as units may be or may not be physical units, that is, the components may be located in one place or may be distributed onto multiple network units. Some or all modules thereof may be selected based on an actual requirement, to implement an objective of the solution in the embodiments. Those skilled in the art can understand and implement the embodiments without any creative work.

Those skilled in the art may further appreciate that, units and steps described in conjunction with the embodiments disclosed herein can be realized by electronic hardware, computer software or a combination thereof. In order to clearly illustrate interchangeability of the hardware and the software, steps and composition of each of the embodiments are described generally in view of functions in the above specification. Whether the function is executed in a hardware way or in a software way depends on applications of the technical solution and design constraint conditions. Those skilled in the art may use different methods to implement the described functions for each particular application, and such implementation should not be regarded as going beyond the scope of the present disclosure.

According to the embodiments disclosed described above, those skilled in the art can implement or use the present disclosure. Various modifications to the embodiments are apparent to those skilled in the art, and the general principle defined herein can be implemented in other embodiments without departing from the spirit or scope of the present disclosure. Therefore, the present disclosure is not limited to the embodiments described herein, but should be in accordance with the widest scope consistent with the principle and novel features disclosed herein.

It should be further noted that the relationship terminologies such as "first" and "second" are only used herein to distinguish one entity or operation from another entity or operation, rather than to necessitate or imply that the actual relationship or order exists between the entities or operations. Moreover, terms of "include", "comprise" or any other variants are intended to be non-exclusive. Therefore, a process, method, article or device including a series of elements includes not only the elements but also other elements that are not enumerated, or also includes the elements inherent for the process, method, article or device. Unless expressively limited otherwise, the statement "comprising (including) one . . . " does not exclude the case that other similar elements may exist in the process, method, article or device.

The invention claimed is:

1. A Module-Level Power Electronics (MLPE) device detection method for an MLPE photovoltaic system, wherein the MLPE photovoltaic system comprises a plurality of MLPE devices each connected to a respective bus corresponding to the respective MLPE device via a respective output terminal, and each of the MLPE devices is configured with a positioning number; and the MLPE device detection method comprises at least one detection process for a selected number of MLPE devices connected to a same corresponding bus, and the at least one detection process comprises:

controlling the selected number of MLPE devices to perform operation state switching simultaneously, and acquiring an operation feature of the bus corresponding to the selected number of MLPE devices before the operation state switching and an operation feature of the bus corresponding to the selected number of MLPE devices after the operation state switching;

determining whether a change, between the operation feature of the bus corresponding to the selected number of MLPE devices before the operation state switching and the operation feature of the bus corresponding to the selected number of MLPE devices after the operation state switching, meets a predetermined change condition; and determining, in a case that the change does not meet the predetermined change condition, that the selected number of MLPE devices with respective positioning numbers includes at least one MLPE device operating in an abnormal state;

wherein the plurality of MLPE devices includes a first group of MLPE devices connected to the same corresponding bus, and the MLPE detection method further comprises:

performing a first troubleshooting process comprising performing the detection process for the first group of MLPE devices connected to the same bus, and in response to determining the first group of MLPE devices connected to the same bus includes at least one MLPE device operating in the abnormal state, performing at least one subsequent troubleshooting process comprising performing the detection process for a smaller subset of the first group of MLPE devices.

2. The MLPE device detection method for the MLPE photovoltaic system according to claim 1, wherein at least one of the plurality of MLPE devices is detected in the at least one detection process.

3. The MLPE device detection method for the MLPE photovoltaic system according to claim 2, wherein the first group of MLPE devices includes all of the MLPE devices which are connected to the same corresponding bus.

4. The MLPE device detection method for the MLPE photovoltaic system according to claim 3, wherein the MLPE device detection method comprises a series of troubleshooting processes including the first troubleshooting process and the at least one subsequent troubleshooting process, and each of the at least one subsequent troubleshooting processes comprises performing the detection process for a smaller subset of the MLPE devices detected in a previous respective troubleshooting process of the series of troubleshooting processes.

5. The MLPE device detection method for the MLPE photovoltaic system according to claim 4, wherein the at least one subsequent troubleshooting process includes a final troubleshooting process comprising performing the detection process for a single MLPE device corresponding to one of the at least one MLPE devices operating in the abnormal state.

6. The MLPE device detection method for the MLPE photovoltaic system according to claim 1, wherein the controlling the selected number of MLPE devices with respective positioning numbers to perform operation state switching comprises:
  transmitting a control command to the selected number of MLPE devices with respective positioning numbers.

7. The MLPE device detection method for the MLPE photovoltaic system according to claim 6, wherein
  the control command comprises a turning on command or a turning off command, and the operation feature of the bus corresponding to the MLPE device is a bus voltage; or
  the control command comprises an outputting active power command, an outputting reactive power command, or a shutdown command, and the operation feature of the bus corresponding to the MLPE device is an output power.

8. The MLPE device detection method for the MLPE photovoltaic system according to claim 1, wherein after determining that the selected number of MLPE devices with respective positioning numbers includes an MLPE device operating in the abnormal state, the MLPE device detection method further comprises:
  calling a number list for the MLPE device operating in the abnormal state, querying the number list based on the positioning number of the MLPE device operating in the abnormal state, and determining an installation position of the MLPE device operating in the abnormal state.

9. The MLPE device detection method for the MLPE photovoltaic system according to claim 8, wherein after determining the installation position of the MLPE device operating in the abnormal state, the MLPE device detection method further comprises:
  generating and outputting an alarm signal to prompt a maintenance alarm for the MLPE device operating in the abnormal state with the respective positioning number.

10. The MLPE device detection method for the MLPE photovoltaic system according to claim 1, wherein before a first detection process is performed, the MLPE device detection method further comprises:
  receiving a detection command, wherein the detection command is periodically transmitted by a cloud processor or is transmitted by a local control device on-site.

11. The MLPE device detection method for the MLPE photovoltaic system according to claim 1, wherein the at least one detection process further comprises: in a case that the change meets the predetermined change condition, determining that the selected number of MLPE devices with respective positioning numbers operate in a normal state.

12. An MLPE photovoltaic system, performing the MLPE device detection method according to claim 1, and comprising: the plurality of MLPE devices, at least one direct-current source and at least one monitoring unit, wherein
  each of the plurality of MLPE devices is connected via a respective input terminal to a respective one of the at least one direct-current source;
  each of the plurality of MLPE devices is communicatively connected to the at least one monitoring unit;
  the at least one monitoring unit is configured to: independently control the MLPE devices, and sample or acquire the operation feature of the respective bus; and
  the at least one monitoring unit or a cloud server is configured to: perform the at least one detection process.

13. The MLPE photovoltaic system according to claim 12, wherein each of the plurality of MLPE devices is an optimizer, a shutdown device or a micro inverter, and each of the at least one direct-current source is a photovoltaic module.

14. The MLPE photovoltaic system according to claim 13, wherein
  each of the MLPE devices comprises the optimizer or the shutdown device, and the at least one monitoring unit is an independent device or a controller in a photovoltaic inverter connected to each of the buses at a direct-current side; or
  each of the MLPE devices comprises the micro inverter, and the at least one monitoring unit is an independent device.

15. The MLPE photovoltaic system according to claim 14, wherein
  each of the MLPE devices comprises the micro inverter, and the at least one monitoring unit is arranged in an alternating-current combiner box and is communicatively connected to an intelligent electric meter in the alternating-current combiner box to obtain the operation feature of the alternating-current bus.

16. The MLPE photovoltaic system according to claim 12, wherein a number list of the plurality of MLPE devices is preset in the at least one monitoring unit, and the number list comprises the respective positioning number and an installation position of each of the plurality of MLPE devices.

17. The MLPE photovoltaic system according to claim 13, wherein
  each of the MLPE device comprises the optimizer or the shutdown device, and the output terminals of the MLPE devices are connected in series to a direct-current bus in the MLPE photovoltaic system; or
  each of the MLPE device comprises the micro inverter, and the output terminals of the MLPE devices are connected in parallel to an alternating-current bus in the MLPE photovoltaic system.

* * * * *